United States Patent
Schatzberg et al.

(10) Patent No.: US 9,736,807 B2
(45) Date of Patent: Aug. 15, 2017

(54) APPARATUS SYSTEM AND METHOD OF TIME-OF-FLIGHT POSITIONING VIA NEIGHBOR LIST

(71) Applicant: Intel Corporation, Santa Clara, CA (US)

(72) Inventors: Uri Schatzberg, Kiryat Ono (IL); Yuval Amizur, Kfar-Saba (IL); Leor Banin, Petach Tikva (IL); Alexander Sirotkin, Giv'on Hachadasha (IL)

(73) Assignee: INTEL CORPORATION, Santa Clara, CA (US)

( * ) Notice: Subject to any disclaimer, the term of this patent is extended or adjusted under 35 U.S.C. 154(b) by 446 days.

(21) Appl. No.: 13/621,488

(22) Filed: Sep. 17, 2012

(65) Prior Publication Data

US 2014/0078910 A1 Mar. 20, 2014

(51) Int. Cl.
H04W 64/00 (2009.01)
H04W 36/00 (2009.01)
H04W 24/00 (2009.01)
H04W 24/10 (2009.01)
H04W 52/02 (2009.01)
H04W 88/02 (2009.01)
H04W 88/08 (2009.01)

(52) U.S. Cl.
CPC ......... *H04W 64/003* (2013.01); *H04W 24/00* (2013.01); *H04W 24/10* (2013.01); *H04W 36/0061* (2013.01); *H04W 52/0251* (2013.01); *H04W 52/0254* (2013.01); *H04W 64/006* (2013.01); *H04W 88/02* (2013.01); *H04W 88/08* (2013.01); *Y02B 60/50* (2013.01)

(58) Field of Classification Search
None
See application file for complete search history.

(56) References Cited

U.S. PATENT DOCUMENTS

| 6,252,543 | B1 | 6/2001 | Camp | |
|---|---|---|---|---|
| 6,484,034 | B1 * | 11/2002 | Tsunehara et al. | 455/456.6 |
| 6,526,039 | B1 * | 2/2003 | Dahlman et al. | 370/350 |
| 6,560,462 | B1 * | 5/2003 | Ravi et al. | 455/456.1 |
| 7,676,226 | B2 | 3/2010 | Han et al. | |

(Continued)

OTHER PUBLICATIONS

International Search Report and Written Opinion, PCT/ISA/210, PCT/ISA/220, and PCT/ISA/237, mail date Aug. 28, 2013, a total of 10 pages.

(Continued)

*Primary Examiner* — Anh-Vu Ly
*Assistant Examiner* — Robert A Shand
(74) *Attorney, Agent, or Firm* — Shichrur & Co.

(57) ABSTRACT

Systems and methods are directed to use of a neighbor list for wireless indoor navigation. The neighbor list may include related information regarding all neighboring access points (APs). The neighbor list can be transmitted, at least partially, to include the related information of a desired number of or all APs in the neighbor list from one AP to a wireless device. The neighbor list can be transmitted in a Neighbor Report Response (NRR) or a time-of-flight (ToF) Response and allow the wireless device to scan for minimal number of APs for ToF measurements. By using the neighbor list, power consumption and time can be significantly reduced during wireless indoor navigation.

25 Claims, 3 Drawing Sheets

(56) References Cited

U.S. PATENT DOCUMENTS

| | | | |
|---|---|---|---|
| 8,331,335 B2* | 12/2012 | Chhabra | 370/338 |
| 2003/0054835 A1 | 3/2003 | Gutowski et al. | |
| 2004/0203380 A1* | 10/2004 | Hamdi | G01S 5/0289 455/41.2 |
| 2004/0259571 A1* | 12/2004 | Joshi | 455/456.1 |
| 2005/0185615 A1* | 8/2005 | Zegelin | 370/331 |
| 2009/0160710 A1* | 6/2009 | Hwang et al. | 342/387 |
| 2009/0257426 A1 | 10/2009 | Hart et al. | |
| 2009/0286510 A1 | 11/2009 | Huber et al. | |
| 2010/0255856 A1* | 10/2010 | Kansal | G01S 5/0205 455/456.1 |
| 2010/0278141 A1* | 11/2010 | Choi-Grogan | H04W 36/0083 370/331 |
| 2011/0205910 A1* | 8/2011 | Soomro et al. | 370/252 |
| 2011/0275364 A1 | 11/2011 | Austin et al. | |
| 2012/0257536 A1* | 10/2012 | Kholaif et al. | 370/254 |
| 2013/0141233 A1* | 6/2013 | Jacobs et al. | 340/521 |
| 2013/0288689 A1* | 10/2013 | Choi-Grogan et al. | 455/444 |
| 2014/0064128 A1 | 3/2014 | Park et al. | |
| 2014/0094207 A1 | 4/2014 | Amizur et al. | |
| 2014/0098682 A1* | 4/2014 | Cao et al. | 370/252 |
| 2014/0105395 A1 | 4/2014 | Hart et al. | |
| 2015/0045022 A1 | 2/2015 | Prechner et al. | |

OTHER PUBLICATIONS

Charles E. Perkins et al., Ad-hoc On-Demand Distance Vector Routing, Mobile Computing Systems and Applications, 1999, a total of 11 pages.

International Preliminary Report on Patentability and Written Opinion for International Application No. PCT/US2013/047407, mailed on Mar. 26, 2015, 7 pages.

Office Action for U.S. Appl. No. 14/806,939, mailed Aug. 28, 2015, 13 pages.

Search Report for European Patent Application No. 13837030.9 mailed on May 13, 2016, 9 pages.

Office Action for U.S. Appl. No. 14/806,939, dated Oct. 6, 2016, 17 pages.

Office Action for U.S. Appl. No. 14/806,939, dated Mar. 9, 2017, 11 pages.

* cited by examiner

APPARATUS SYSTEM AND METHOD OF TIME-OF-FLIGHT POSITIONING VIA NEIGHBOR LIST

TECHNICAL FIELD

This disclosure relates generally to the field of wireless communications, and in particular, to wireless indoor navigation systems and methods.

BACKGROUND ART

Outdoor navigation has been widely deployed, given the development of various global-navigation-satellite-systems (GNSS). However, such navigation systems do not work well for indoor applications, as indoor environments do not facilitate the effective reception of signals from GNSS satellites.

Indoor navigation systems have been recently developed that are based on wireless networks, such as, for example, Wi-Fi. However, such networks are specifically designed and used for wireless communications and not necessarily optimized for navigation or positioning. Indeed, various attempts have been made to develop indoor navigation systems using time-of-flight (ToF) methods. Time-of-flight (ToF) is basically the overall time that a signal propagates from a wireless device to a network access point (AP) and back to the wireless device. This time value can be converted into distance using the speed of light. ToF methods are considered robust and scalable, but require hardware changes to WiFi modem. ToF methods also generally pose a high barrier-to-entry, since implementation requires substantive changes in current navigation and wireless technologies.

DETAILED DESCRIPTION

In the description that follows, like components have been given the same reference numerals, regardless of whether they are shown in different embodiments. To illustrate an embodiment(s) of the present disclosure in a clear and concise manner, the drawings may not necessarily be to scale and certain features may be shown in somewhat schematic form. Features that are described and/or illustrated with respect to one embodiment may be used in the same way or in a similar way in one or more other embodiments and/or in combination with or instead of the features of the other embodiments.

In accordance with various embodiments of this disclosure, what is proposed is systems and methods for wireless indoor navigation by using a neighbor list. The neighbor list may include related information regarding all neighboring access points (APs). The neighbor list can be transmitted, at least partially, to include the related information of a desired number of or all APs in the neighbor list from one AP to a wireless device.

For example, in one embodiment, a system is presented that includes a wireless device, and a plurality of access points (APs). The wireless device can be configured to receive at least a neighbor list from one AP of the plurality of APs. The neighbor list from the one AP may include information regarding the plurality of APs.

In another embodiment, a method is presented by using a wireless device to scan a plurality of access points (APs) to use one AP from the plurality of APs. The wireless device may request a Neighbor Report from the one AP and then receive a Neighbor Report Response (NRR) from the one AP in response to the neighbor report request. The NRR received from the one AP can include a neighbor list including information regarding the plurality of APs. A number of APs may then be chosen from the plurality of APs in the neighbor list by the wireless device. To determine a location of the wireless device, the wireless device may send a time-of-flight (ToF) request to the number of APs for a ToF measurement.

In yet another embodiment, a method is presented by using a wireless device to scan a plurality of access points (APs) to use one AP from the plurality of APs. The wireless device may send a time-of-flight (ToF) request to the one AP and then receive a ToF Response from the one AP in response to the ToF request. The ToF Response may include a neighbor list having information regarding the plurality of APs. A number of APs may then be chosen from the plurality of APs in the neighbor list by the wireless device. To determine a location of the wireless device, the wireless device may send a time-of-flight (ToF) request to the number of APs for a ToF measurement.

These and other features and characteristics, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of claims. As used in the specification and in the claims, the singular form of "a", "an", and "the" include plural referents unless the context clearly dictates otherwise.

For conventional indoor navigation systems, the inventors have observed that a wireless device desirous of achieving ToF-positioning has to first perform a passive scan at various frequency bands to identify all neighboring APs having ToF capabilities. Then, the wireless device has to decide which APs it would like to send a ToF request to. This is achieved based on information that is transmitted from each of the neighboring APs to the wireless device. In so doing, a substantial amount of power is consumed and a significant amount of time is spent in the preliminary stages of the indoor navigation process.

Figure 1:
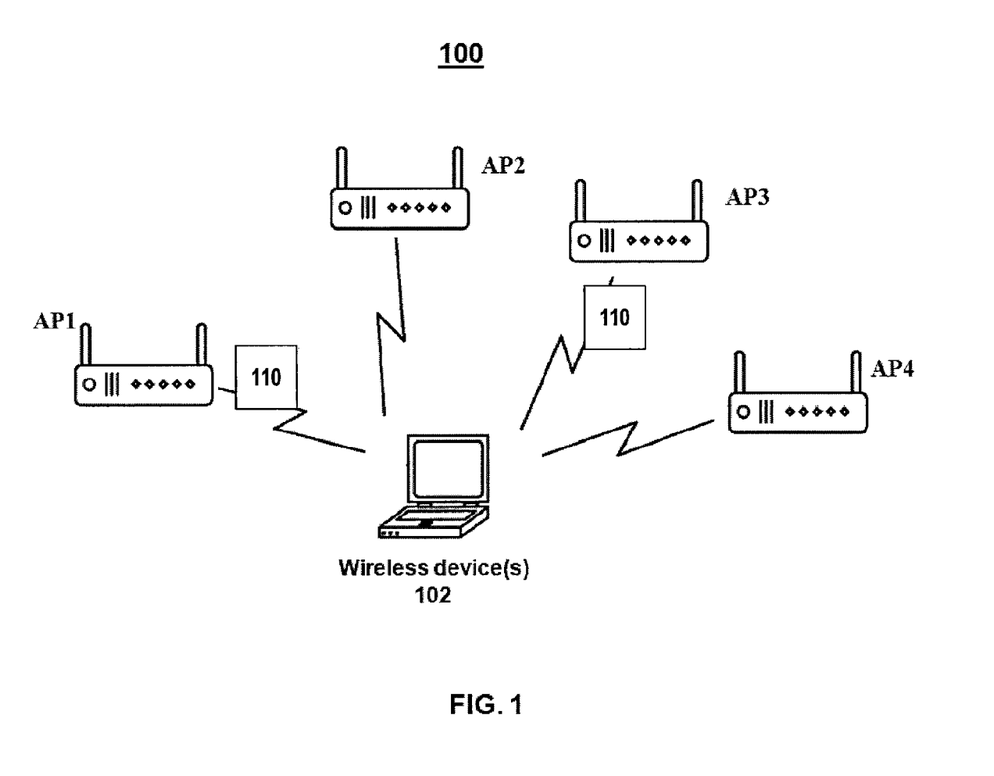
FIG. 1 depicts a functional block diagram of a wireless location identification system, in accordance with various aspects and principles of the present disclosure.

With this said, FIG. 1 depicts a functional block diagram of a wireless location identification system 100 configured, for example, to perform ToF measurements, in accordance with various aspects and principles of the present disclosure. As shown in FIG. 1, system 100 includes multiple network APs, e.g., AP1, AP2, AP3, AP4, etc., and wireless device 102 at an unknown position. Note that although FIG. 1 depicts four APs in the system, one of ordinary skill in the art would appreciate that the system 100 may include more or less than four APs. In one embodiment, system 100 incorporates at least three APs that may receive wireless signals from a wireless device that is at an unknown location.

It will be appreciated that, as used herein, the term "access point" or "AP" refers to any device with the ability to receive wireless signals from one or more devices and provides access to a network, such as a local area network (LAN) or the Internet, for example. An AP may be installed at a fixed terrestrial location or may be installed on a vehicle or mobile apparatus. In one aspect, an AP may include a femtocell utilized to extend cellular telephone service into a business or home. In such an implementation, one or more wireless devices may communicate with the femtocell via a code division multiple access (CDMA) cellular communication protocol, for example, and the femtocell would provide the wireless devices access to a larger cellular telecommunication network by way of another broadband network such as the Internet. In certain aspects, an AP may be a dedicated ToF tag AP. The dedicated ToF tag AP may not be connected to a network but may have ToF capabilities to receive and respond to a ToF request, for example. Of course, these are example implementations utilizing one or more wireless devices and an AP, and the scope of claimed subject matter is not limited in this respect.

Moreover, as used herein, the term "wireless device(s)" refers to any device that may communicate with other devices via wireless signals. Such devices may comprise, for example, a laptop, mobile device, cellular/smartphone, gaming device, tablet computer, a wireless-enabled patient monitoring device, personal communication system (PCS) device, personal digital assistant (PDA), personal audio device (PAD), portable navigational device, and/or any other electronic wireless-enabled device configured to receive a wireless signal. It may also include relatively stationary devices such as desktop computers with wireless capabilities. Such wireless devices may communicate via any number of wireless communication protocols, examples of which are described below. As disclosed herein, the term wireless device may be interchangeably used with wireless user (or WiFi user), wireless STA (or WiFi STA), etc.

Further, as used herein, the term "network" refers to a wireless communication network that may be utilized in example implementations as discussed below. The network may be configured to operate under a variety of wireless communication protocols and standards, such as, for example, Wi-Fi, WiMax, WWAN, WLAN, WPAN, Bluetooth, GSM, CDMA, GPRS, 3G or 4G, LTE, Wireless USB, the IEEE 802.11x standard, such as IEEE std. 802.11k-2008 published Jun. 12, 2008, or IEEE std. 802.11-2012 published Mar. 29, 2012, or any other implementation of a suitable wireless standard. It will be appreciated that the wireless communication is not limited to any specific standard and the examples discussed may be implemented separately or in combination with each other.

Returning to FIG. 1, in system 100, APs 1-4 may be devices that allow for wireless devices to communicate with each other by acting as both a transmitter and receiver of WLAN radio signals. As noted above, APs 1-4 may take the form of any APs as disclosed herein including, for example, dedicated hardware devices that include a built-in network adapter, antenna, radio transmitter, etc., while wireless device 102 may take the form, such as, for example, wireless telephone, notebook computer, personal digital assistant, etc.

System 100 employs a neighbor list mechanism 110 that is configured to contain relevant information regarding neighboring APs. In this manner, by reaching one AP, instead of reaching each and every neighboring APs, relevant information regarding all neighboring APs can be transmitted from the one AP to wireless device 102. The neighbor list mechanism 110 enables wireless device 102 to scan for a number of APs, e.g., having a minimal number of APs that is sufficient for the ToF measurements. In other words, wireless device 102 does not need to scan all frequency bands, rather it will decide a minimal number of APs that wireless device 102 wants to use for ToF by examining the neighbor list mechanism 110 received from one AP used from all neighboring APs.

In some embodiments, neighbor list mechanism 110 may be incorporated in a Neighbor Report Response (NRR), according to IEEE 802.11x standard. The NRR is furnished by an AP in response to a Neighbor Report Request initiated by wireless device 102. It will be appreciated that the IEEE 802.11x standard allows an AP to store a neighbor table. However, different from the standard neighbor table, by virtue of incorporating neighbor list mechanism 110, the table is supplemented with relevant information about all neighboring APs.

In addition, the IEEE 802.11x standard enables wireless device 102 to request a Neighbor Report from one AP. In accordance with various embodiments, information of all neighboring APs may then be included in the NRR in response to a Neighbor Report Request of wireless device 102 from one AP. Because the NRR includes information of all neighboring APs, by reaching this one AP, information of all neighboring APs can be transmitted from the single AP to wireless device 102.

As such, neighbor list mechanism 110 may comprise information elements (IEs) added to a NRR, or added into Neighbor Report Elements (e.g., as sub-elements) of the NRR, or added into the basic service set identification (BSSID) information fields of the Neighbor Report Elements of the NRR.

In other embodiments, neighbor list mechanism 110 may be piggybacked onto or otherwise coupled to an AP ToF response in reply to a ToF request by wireless device 102. The piggybacked neighbor list mechanism 110 may, for example, comprise information elements (IEs) to include information of all APs, or may be defined as sub-elements of Neighbor Report Elements for all APs, or can be defined in the BSSID information field of Neighbor Report Elements, although the Neighbor Report Elements are not contained in a NRR in this example.

In certain embodiments, information regarding all APs in neighbor list mechanism 110 may include any desired information of each AP according to applications and requirements of the indoor navigation system. In one aspect, the information for each AP in neighbor list mechanism 110 may include positioning information desired for indoor positioning of wireless device 102 in a wireless communication system.

Table 1 depicts examples of positioning information of each AP of the neighboring APs in neighbor list mechanism 110. The positioning information may include information regarding, for example, (1) AP position indicative of geographic location of the AP; (2) AP position accuracy indicative of how accurate the obtained geographic location is; (3) AP position source indicative of which type of source the AP obtains its geographic location; (4) time passed since AP position update indicative of the last time the geographic location was updated; (5) AP timing offset calibration accuracy (e.g., which can be set to zero when the AP is not calibrated); (6) AP type; (7) distance from one or more neighboring APs; etc.

TABLE 1

| | Positioning Information |
|---|---|
| 1 | AP position |
| 2 | AP position accuracy |
| 3 | AP position source |
| 4 | Time passed since AP position update |
| 5 | AP timing offset calibration |
| 6 | AP type |
| 7 | Distance from one or more neighboring APs |
| ... | ... |

In turn, information regarding the AP type may include information of whether the AP is stationary or mobile, whether the AP is a pseudo AP or not, whether the AP is a dedicated time-of-flight (ToF) tag AP or not, and/or whether the AP is a wireless AP or wireless non-AP (e.g., a client). Moreover, information regarding distance from one or more neighboring APs may include information of how far the AP is from other neighboring APs.

In various embodiments, the AP position source can be manually configured, automatically deduced from other APs within certain accuracy, provided by a networked server, etc. In certain embodiments, the pseudo-AP may be configured to provide lower radiated RF power, smaller coverage, and deployed for only location determination purposes.

As known in the art, the standard Neighbor Report Response (NRR) uses an Action frame body format. The format of the Action field in the NRR is shown in FIG. 8-443, IEEE 802.11-2012, section 8.5.7.7, for example, and indicated below.

| FIG. 8-443 NRR frame Action field format at IEEE 802.11-2012 | | | |
|---|---|---|---|
| Category | Radio Measurement action | Dialog token | Neighbor Report Elements |

In certain embodiments, neighbor list mechanism 110 includes information of all neighboring APs that may be defined in an NRR as information elements (IEs), e.g., see Table 2a. The defined information elements can include, for example, positioning information (see Table 1) of all neighboring APs, and can be included into the standard NRR frame.

TABLE 2a

| NRR frame Action Field Format | | | | |
|---|---|---|---|---|
| Category | Radio Measurement action | Dialog token | Neighbor Report Elements | Information Elements of all APs |

In other embodiments, neighbor list mechanism 110 includes information of all neighboring APs that may be added into Neighbor Report Elements, e.g., see FIG. 8-215 of section 8.4.2.39 of 802.11-2012, of standard NRR.

| FIG. 8-215 Neighbor Report Element format at IEEE 802.11-2012 | | | | | | | |
|---|---|---|---|---|---|---|---|
| Element ID | Length | BSSID | BSSID Information | Operating Class | Channel Number | PHY Type | Optional Subelements |

For example, relevant information of each AP (e.g., see Table 1) may be added into each Neighbor Report Element of standard NRR frame, for example, as a sub-element as depicted in Table 2b. In other embodiments, information of each AP (e.g., positioning information in Table 1) may be added into the BSSID information field of each Neighbor Report Element, as depicted in Table 2c. In yet other embodiments, some of information of each AP can be added into a sub-element, and some of information of each AP may be added into the BSSID information field of the each Neighbor Report Element.

TABLE 2b

| Neighbor Report Element format | | | | | | | |
|---|---|---|---|---|---|---|---|
| Element ID | Length | BSSID | BSSID Information | Operating Class | Channel Number | PHY Type | Optional Subelements | Subelement of each AP |

TABLE 2c

| Neighbor Report Element format | | | | | | |
|---|---|---|---|---|---|---|
| Element ID | Length | BSSID | BSSID Information Information of each AP | Operating Class | Channel Number | PHY Type | Optional Subelements |

By using Neighbor Report Element format, as depicted in Table 2b and/or Table 2c, relevant information of all neighboring APs as desired can be include in the Neighbor Report Elements of the NRR to provide neighbor list mechanism 110.

In embodiments without being configured in an NRR, neighbor list mechanism 110 may be transmitted from one AP to wireless device 102 in any suitable manner. For example, neighbor list mechanism 110 may be piggybacked onto a ToF response and defined as information elements as similarly shown in Table 2a, or as Neighbor Report Elements with each Neighbor Report Element having a format as similarly shown in Tables 2b and/or 2c.

Figure 2:
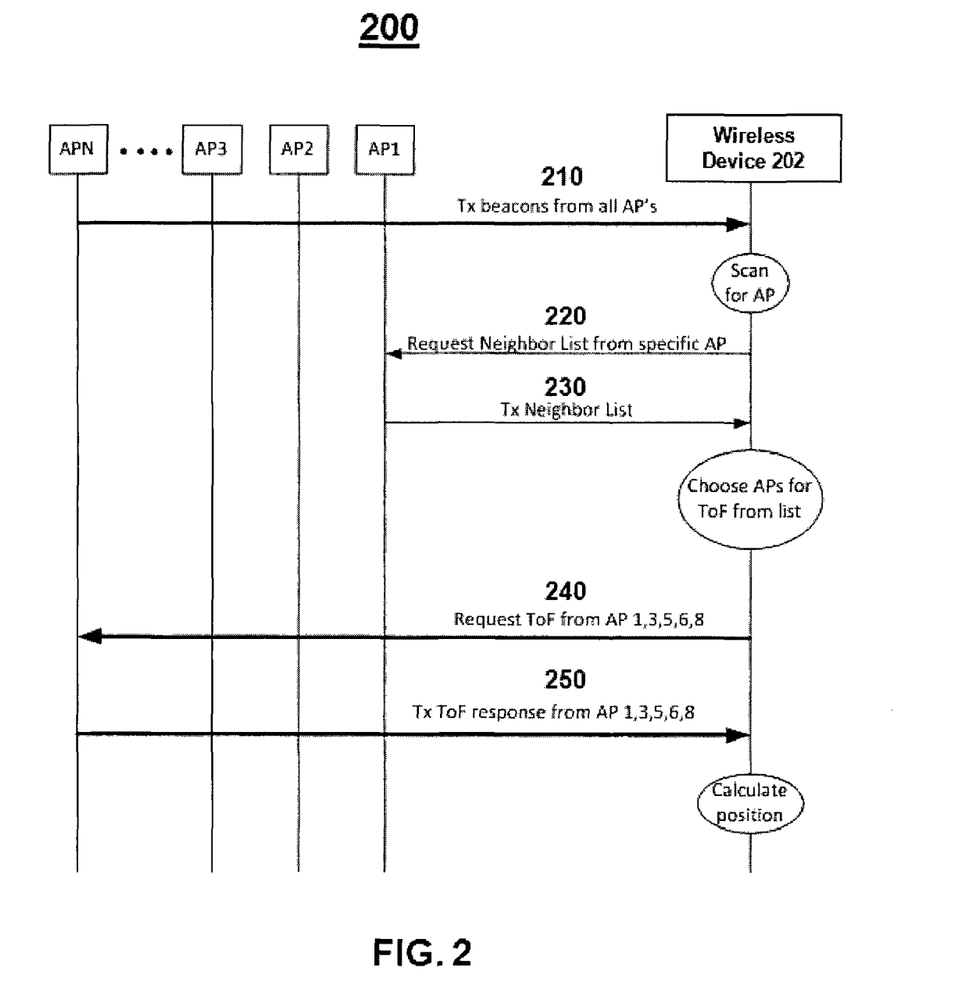
FIG. 2 depicts a flow diagram illustrating an exemplary method for wireless location identification, in accordance with various aspects and principles of the present disclosure.

FIG. 2 depicts a flow diagram illustrating an exemplary method 200, e.g., including ToF measurements using similar or same system as depicted in FIG. 1, in accordance with various aspects and principles of the present disclosure. As shown in FIG. 2, method 200 may use a system or network having a plurality of APs, e.g., AP1, AP2, AP3, until APN (where N is 4 or greater in this case), and a wireless device 202 at an unknown position.

At interval 210 of FIG. 2, RF beacon signal may be broadcasted, transmitted from each of all neighboring APs. As the wireless device 202 scans the entire frequency range, it may use the first AP that it encounters. In certain embodiments, the wireless device 202 may use one AP of all neighboring APs, e.g., according to a distance (e.g., the nearest) from the wireless device 202, or according to other operational criteria.

At interval 220 of FIG. 2, the wireless device 202 may send an action frame to request a Neighbor Report from the one AP as used in the interval 210. In some embodiments, this Neighbor Report Request may need to be enhanced so that the wireless device 202 is able to indicate that it is interested in receiving the neighboring list containing information (e.g., the positioning information in Table 1) of all neighboring APs. For example, standard Neighbor Report Request (see FIG. 8-442 in section 8.5.7.6 at 802.11-2012) can be enhanced via an optional sub-element or an added sub-element to indicate that the wireless device is interested in receiving the neighbor list.

At interval 230 of FIG. 2, in response to the Neighbor Report Request, a NRR containing at least the neighbor list can be sent from the one AP to the wireless device 202. Based on the information of all APs obtained in the NRR from the one AP, wireless device 202 may choose a number of APs, e.g., a minimal number such as one or more of APs, with all the information needed to conduct reliable ToF measurements. For example, when trilateration or other similar positioning techniques are used for ToF measurements, at least three APs may be chosen and used at interval 230. In another example, when sensors or other similar positioning devices/techniques are used for ToF measurements, one or two (or three, etc.) APs may be chosen and used in the ToF measurements.

At interval 240 of FIG. 2, wireless device 202 may then request ToF from each of the number of APs, e.g., APs 1, 3, 5, 6, and 8 as shown in FIG. 2, chosen at interval 230.

At interval 250 of FIG. 2, in response to the ToF request, ToF response may be transmitted from each of the number of APs. The distance between the wireless device 202 and each AP involved can be calculated and a position of the wireless device 202 may then be estimated according to the ToF measurements, e.g., via trilateration techniques.

In this manner, having relevant information, such as, positioning-related data, of all neighboring APs in neighbor list mechanism 110, as embodied in an NRR frame by the various techniques disclosed herein, enables wireless device 102 to interact with one AP to receive all the information in neighbor list mechanism 110, from which a minimal number of APs can be determined to conduct ToF measurements.

Alternatively, neighbor list mechanism 110 may not be contained in a NRR, and may be transmitted from one AP to wireless device 102, e.g., as a piggybacked information. That is, neighbor list mechanism 110 can be piggybacked onto or otherwise coupled to a ToF response in response to a ToF request by wireless device 102 from an AP, although neighbor list mechanism 110 may still be similarly defined as information elements (IEs) to include information of all APs, or defined in sub-elements of Neighbor Report Elements for all APs, or defined in the BSSID information fields of the Neighbor Report Elements.

Figure 3:
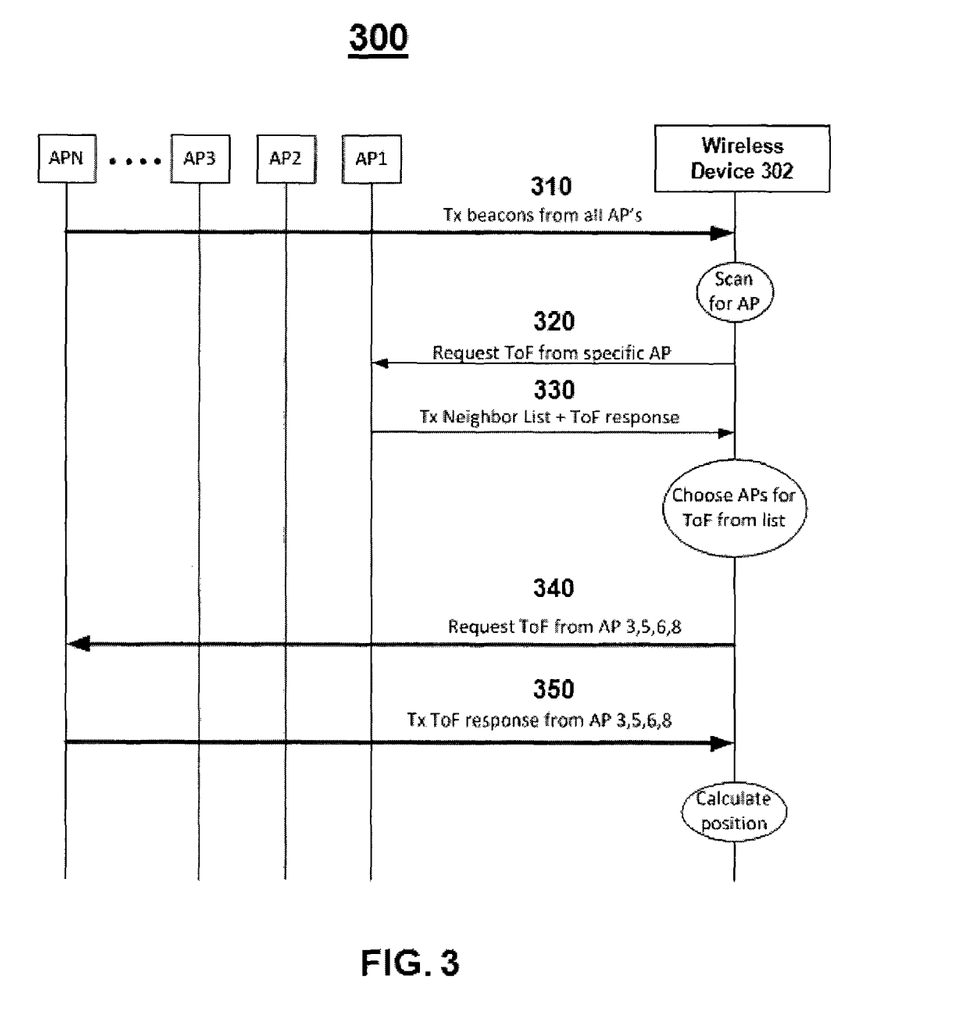
FIG. 3 depicts a flow diagram illustrating another exemplary method for wireless location identification, in accordance with various aspects and principles of the present disclosure.

To this end, FIG. 3 depicts a flow diagram illustrating another exemplary method 300, e.g., including ToF measurements using similar or same system as depicted in FIGS. 1-2, in accordance with various aspects and principles of the present disclosure. As shown in FIG. 3, method 300 may use a system or network having a plurality of APs, e.g., AP1, AP2, AP3, until APN (where N is 4 or greater in this case), and a wireless device 302 at an unknown position.

At interval 310 of FIG. 3, RF beacon signal can be broadcast, transmitted from each of all neighboring APs. As the wireless device 302 scans the entire frequency range, it may use the first AP that it encounters, or in certain embodiments, it may use the one AP according to, e.g., a distance (e.g., the nearest) from the wireless device 202, or according to other operational criteria.

At interval 320 of FIG. 3, the wireless device 302 can then request ToF from the one AP as used at interval 310.

At interval 330 of FIG. 3, in reply to the ToF Request, a ToF Response at least containing the above mentioned neighbor list including related information of all APs can be sent from the one AP to the wireless device 302, e.g., in an unassociated state. In some embodiments, the one AP may transmit the entire neighbor list containing all neighboring APs to the wireless device. In other embodiments, the one AP may transmit a part of the entire neighbor list containing a certain number of neighboring APs as desired. Based on the related information of all APs obtained in the Neighbor list of the one AP, wireless device 302 can choose a number of APs, e.g., a minimal number of APs with all the information needed for the ToF measurements. The minimal number of APs may refer to a number of one or more APs depending on the positioning device/techniques used for the ToF measurements as described herein.

At interval 340 of FIG. 3, wireless device 302 can then request ToF from each of the number of APs, e.g., APs 3, 5, 6, and 8 as shown in FIG. 3, as chosen at interval 330.

At interval 350 of FIG. 3, in reply to the ToF request, ToF response can be transmitted from each of the number of APs. The distance between wireless device 302 and each of the number of APs can be calculated and a position of wireless device 302 can then be estimated according to the ToF measurements, e.g., via trilateration techniques.

In this manner, each AP in a system for positioning wireless device 102 may provide relevant information (e.g., positioning information) of all neighboring APs in neighbor list mechanism 110. The information of all neighboring APs can be added into a Neighbor Report Response or can be piggybacked onto a ToF response, in response to a respective request by the wireless device from one AP. Based on neighbor list mechanism 110 obtained from the one AP (instead of all APs), minimal number of APs can be chosen to request ToF therefrom to position wireless device 102. Accordingly, power consumption and time can be significantly reduced.

Having thus described the basic concepts, it will be rather apparent to those skilled in the art after reading this detailed disclosure that the foregoing detailed disclosure is intended to be presented by way of example only and is not limiting. Various alterations, improvements, and modifications will occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure. In addition, the term "logic" is representative of hardware, firmware, software (or any combination thereof) to perform one or more functions. For instance, examples of "hardware" include, but are not limited to, an integrated circuit, a finite state machine, or even combinatorial logic. The integrated circuit may take the form of a processor such as a microprocessor, an application specific integrated circuit, a digital signal processor, a micro-controller, or the like.

Furthermore, the recited order of processing elements or sequences, or the use of numbers, letters, or other designations therefore, is not intended to limit the claimed processes and methods to any order except as can be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, as the following claims reflect, inventive embodiments lie in less than all features of a single foregoing disclosed embodiment. Thus, the claims following the detailed description are hereby expressly incorporated into this detailed description.

What is claimed is:

1. A system comprising:
a wireless device including a radio and an antenna,
wherein the wireless device is configured to receive at least a neighbor list from one AP of a plurality of APs, the neighbor list comprising information of the plurality of APs, the information of the plurality of APs comprising, for an AP of the plurality of APs, an indication of Time of Flight (ToF) capabilities of the AP, the wireless device is configured to choose a certain number of APs from the plurality of APs, based at least on the neighbor list, and to perform ToF measurements with the certain number of APs to determine a location of the wireless device.

2. The system of claim 1, wherein the information of the plurality of APs comprises positioning information of each of the plurality of APs.

3. The system of claim 2, wherein the positioning information comprises an AP position, an AP position accuracy, an AP position source, a time passed since a last update of the AP position, an AP timing offset calibration accuracy, a distance from one or more neighboring APs, or any combination thereof.

4. The system of claim 2, wherein the information of the plurality of APs comprises an AP type indicating whether the AP is stationary or mobile, whether the AP is a pseudo AP or not, whether the AP is a dedicated time-of-flight (ToF) tag AP or not, whether the AP is a wireless AP or a wireless non-AP, or any combination thereof.

5. The system of claim 1, wherein the neighbor list is contained in a Neighbor Report Response (NRR) in response to a request of neighbor report requested by the wireless device from the one AP.

6. The system of claim 5, wherein the neighbor list is defined as information elements in the NRR.

7. The system of claim 5, wherein the neighbor list is defined in subelements of Neighbor Report Elements of the NRR.

8. The system of claim 5, wherein the neighbor list is defined in BSSID (basic service set identification) information fields of Neighbor Report Elements of the NRR.

9. The system of claim 1, wherein the neighbor list is piggybacked onto a time-of-flight (ToF) response in response to a ToF request requested by the wireless device from the one AP.

10. The system of claim 9, wherein the neighbor list is defined as information elements piggybacked onto the ToF response.

11. The system of claim 9, wherein the neighbor list is defined in sub-elements of Neighbor Report Elements piggybacked onto the ToF response.

12. The system of claim 9, wherein the neighbor list is defined in BSSID information fields of Neighbor Report Elements piggybacked onto the ToF response.

13. A method comprising:
determining, by a wireless device, a selected access point (AP) from a plurality of APs, from which radio-frequency (RF) beacon signals are received;
requesting, by the wireless device, a Neighbor Report from the selected AP;
receiving a Neighbor Report Response (NRR) from the selected AP in response to the request for the neighbor report by the wireless device, wherein the NRR comprises a neighbor list comprising information of the plurality of APs, the information of the plurality of APs comprising, for an AP of the plurality of APs, an indication of Time of Flight (ToF) capabilities of the AP of said plurality of APs;
choosing a number of APs from the plurality of APs in the neighbor list by the wireless device; and
sending time-of-flight (ToF) requests by the wireless device to the number of APs to determine a location of the wireless device.

14. The method of claim 13, wherein the information of the plurality of APs comprises positioning information of AP position, AP position accuracy, AP position source, time passed since last update of the AP position, AP timing offset calibration accuracy, distance from one or more neighboring APs, or any combination thereof.

15. The method of claim 13, wherein the neighbor list is defined as information elements in the NRR, or defined as sub-elements of Neighbor Report Elements of the NRR, or defined in BSSID information fields of Neighbor Report Elements of the NRR.

16. The method of claim 13, wherein determining the selected AP is based on a distance of the selected AP from the wireless device.

17. The method of claim 13, wherein the requesting the Neighbor Report further comprises enhancing the Neighbor Report Request by the wireless device to indicate that the wireless device is interested in receiving the neighbor list.

18. The method of claim 17, further comprising using a subelement in a Neighbor Report Request to enhance the Neighbor Report Request.

19. The method of claim 13, wherein the choosing the number of APs comprises choosing at least three APs from the plurality of APs in the neighbor list.

20. A method comprising:
selecting one access point (AP) by a wireless device from a plurality of APs, form which RF beacon signals are received;
sending a time-of-flight (ToF) request by the wireless device to the one AP;
receiving a ToF Response by the wireless device from the one AP in response to the ToF request, wherein the ToF Response comprises a neighbor list comprising information of the plurality of APs, the information of the plurality of APs comprising, for an AP of the plurality of APs, an indication of Time of Flight (ToF) capabilities of the AP of said plurality of APs;
choosing a number of APs from the plurality of APs in the neighbor list by the wireless device; and
sending time-of-flight (ToF) requests by the wireless device to the number of APs to determine a location of the wireless device.

21. The method of claim 20, wherein the information of the plurality of APs comprises positioning information of AP position, AP position accuracy, AP position source, Time passed since last update of the AP position, AP timing offset calibration accuracy, Distance from one or more neighboring APs, or any combination thereof.

22. The method of claim 20, wherein the neighbor list is defined as information elements piggybacked onto the ToF response; defined in sub-elements of Neighbor Report Elements piggybacked onto the ToF response; or defined in BSSID information fields of Neighbor Report Elements piggybacked onto the ToF response.

23. The method of claim 20, wherein the selecting one AP is based on a distance of the one AP to the wireless device.

24. The method of claim 20, wherein the choosing the number of APs comprises choosing at least three APs from the plurality of APs in the neighbor list.

25. The method of claim 20, further comprising:
receiving a ToF response from each of the number of APs;
determining a distance between the wireless device and each of the number of APs based on the respective ToF response; and
determining the location of the wireless device based on the determined distances.

* * * * *